Aug. 18, 1953  C. D. SHELBURNE  2,649,258
FISHING REEL
Filed May 11, 1949
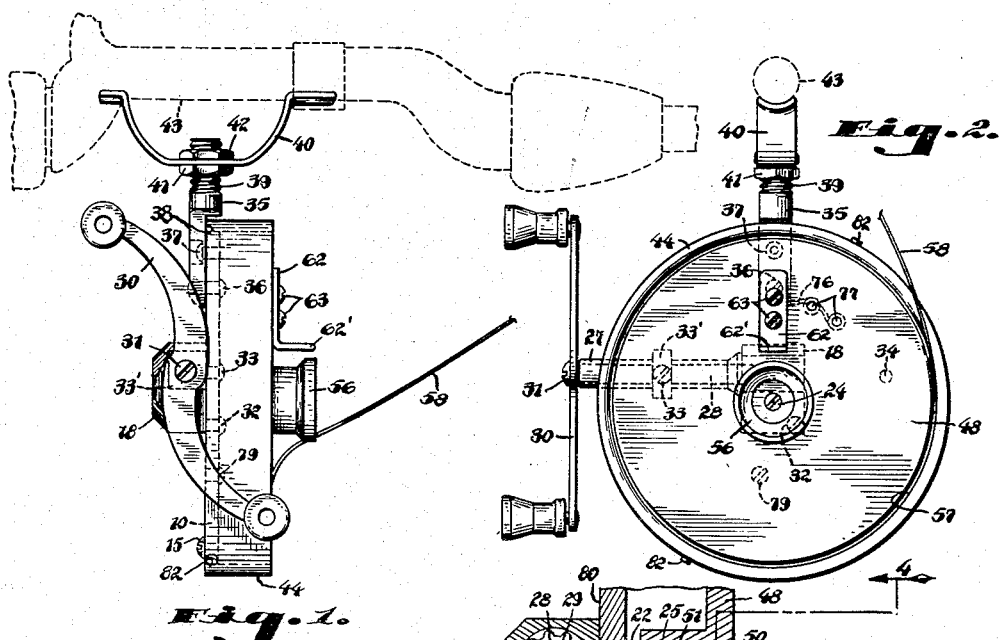
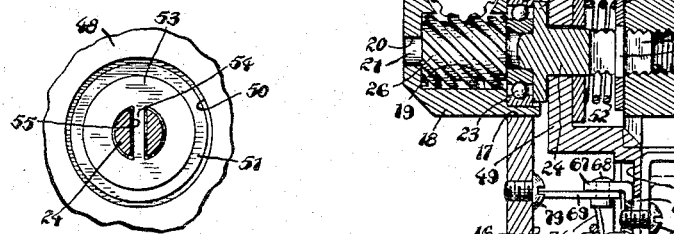
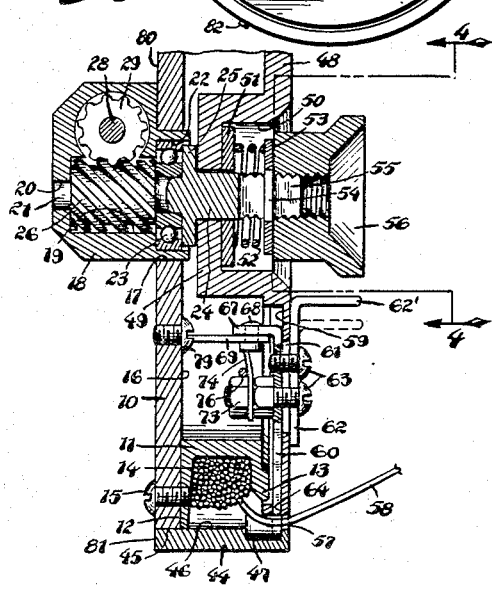
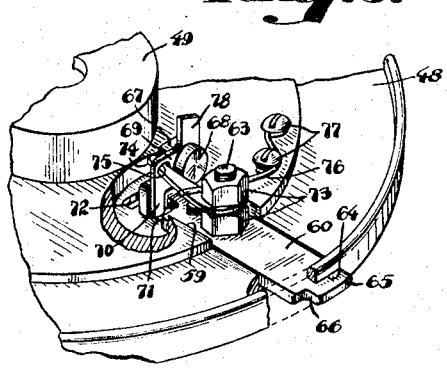
INVENTOR.
CLYDE D. SHELBURNE,
BY: Harold B. Hood.
ATTORNEY.

Patented Aug. 18, 1953

2,649,258

UNITED STATES PATENT OFFICE 2,649,258

FISHING REEL

Clyde D. Shelburne, Shelburn, Ind.

Application May 11, 1949, Serial No. 92,610

6 Claims. (Cl. 242—84.1)

The present invention relates to a line winding device which finds its primary utility as a fishing reel, and which has therefore been illustrated, and will be described, in that embodiment. It will be clear, however, that the invention is applicable, also, to other types of devices for winding and releasing lines of various characters.

Numerous advantages arise, particularly in connection with fishing tackle, from the use of a so-called "spinner type" reel in which line may be stripped axially from a coil previously laid upon a drum, without producing rotation of the drum. These advantages have become widely known within the past several yars, and need not be detailed here. In one form of spinner type reel, line is returned to the reel by rotation of the drum. A defect in that type of reel lies in the fact that a twist is cumulatively induced in the line each time it is stripped axially from the drum and returned thereto by rotation of the drum. This defect is overcome in the type of reel in which the drum is stationary, and line is returned to the drum through the medium of a catch element which is caused to revolve about the axis of the drum, in such a fashion as to lay the line in successive turns upon the periphery of the drum. The present invention relates to the latter type of reel.

The primary object of the invention is to provide an extremely simple and inexpensive mechanism including a stationary drum formed to provide a peripheral well in which line may be retained in coiled condition, and including a catch element arranged to be conveniently manually withdrawn from active position, together with latch means whereby such element will be held in retracted position, and means whereby, upon initiation of revolution of the catch element about the axis of the drum, the catch element will be automatically projected into active position.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a reel constructed in accordance with my invention, shown in one selective position of cooperation upon a fishing rod;

Fig. 2 is a front elevation thereof;

Fig. 3 is a fragmental transverse section therethrough, drawn to an enlarged scale;

Fig. 4 is a fragmentary sectional view taken upon the line 4—4 of Fig. 3; and

Fig. 5 is a fragmentary perspective of a portion of the inner surface of the rotor, parts being broken away for clarity of illustration, and showing the catch element and latch mechanism in detail.

Referring more particularly to the drawings, it will be seen that the illustrated embodiment of my invention includes a discoid base member 10 upon which the reel assembly as a whole is supported. A drum 11, provided with axially-spaced, radially-projecting peripheral flanges 12 and 13, which cooperate to provide an outwardly-opening peripheral well 14, is secured by screws 15, or the like, to one end surface 16 of said base 10. The base is formed with an axial perforation 17 in which is entered a cylindrical projection formed upon a gear housing 18 having a chamber 19 which is coaxial with the perforation 17 when the casing 18 is assembled with the base 10. A bearing opening 20 in said casing 18 supports a reduced end 21 of a shaft 24; and a pocket 22 in the projection of the housing 18, coaxial with the opening 20, receives a ball bearing 23 in which is journalled an intermediate portion of the shaft 24, an integral collar 25 on the shaft 24 abutting an end face of said bearing 23. Within the chamber 19, the shaft carries a spiral gear 26.

The casing 18 includes a tubular housing 27 which may be integral with, or assembled with, said casing; and a shaft 28 is journalled in said extension, carrying a spiral gear 29 within the casing and meshing with the gear 26. A crank 30 of suitable construction is assembled with the shaft 28 by means of a screw 31, or equavalent fastening means.

A screw 32 penetrates the base 10, entering from the surface 16 thereof, and is threaded into a tapped socket in the casing 18; and a second screw 33 penetrates the base 10 in the same direction to enter a tapped socket in a bearing block 33' sleeved on the extension 27. Thus the assembly including the shaft 24, crank 30, and the driving connection therebetween, is secured in place upon the surface 80 of the base 10.

The reel is shown assembled with a fishing rod in position for fly casting. If it is desired to assemble the reel with a rod for bait casting, the screw 33 may be removed to permit withdrawal of the extension 27. The shaft 28 with its gear 29 may then be withdrawn from the casing 18 by movement thereof toward the right as viewed in Fig. 2. The shaft and gear 27 may now be reassembled in the casing 18, by entry thereof from the opposite side of the casing, so that the shaft will project to the right of the casing as viewed in Fig. 2. Now, the projection 27 may be sleeved on the shaft, and the screw 33 may be entered through the perforation 34 of the base and threaded into its socket in the block 33'.

A bracket 35 is secured to the surface 80 of the base 10 by means of a screw 36 penetrating the base 10 from the surface 16 thereof and a second screw 37 oppositely entered. The bracket, which is in the form of a cylindrical post, is preferably notched as shown to provide a flat surface 38 to abut the surface 80 of the base 10. The portion 39 of the bracket 35, projecting radially beyond the reel assembly, is threaded for the reception of a U-base 40 which may be adjustably secured in place on said bracket by clamping nuts 41 and 42. The base 40, of course, may be secured to the reel seat 43 of a fishing rod, indicated in dotted lines in Figs. 1 and 2, in the conventional fashion.

An annular guard ring 44 is supported from the base 10, said ring being proportioned and designed to have a frictional fit with the peripheral surface 45 of the base 10. Said ring is preferably formed to provide a continuous, inwardly-facing, peripheral surface 46 which spans the axial extent of the drum 11, and projects somewhat beyond that end of the drum remote from the base 10. Preferably, the surface 46 will be formed with a groove 47, at least a portion of which is located axially beyond the drum flange 13. The surface 46 is radially slightly spaced from the periphery of the drum flange 13.

A motor disc 48 is centrally formed with an axially offset portion 49 adapted to bear against the collar 25, and providing an outwardly-opening central well 50 in which may be received a friction disc 51. The rotor 48 is centrally perforated to fit snugly on the shaft 24, and the disc 51 is similarly perforated. A coiled spring 52 is sleeved on the shaft 24 within the well 50, and a washer 53, having a diametrical bar 54 spanning its central perforation, is sleeved on the end of the shaft 24 to bear against the outer end of the spring 52, said shaft being kerfed, as at 55, for accommodation of the bar 54. A knob 56 is threaded on the outer end of the shaft 24, bearing upon the washer 53; and it will be apparent that, by adjustment of the knob 56, the degree of compression of the spring 52, and consequently the frictional engagement between the shaft 24 and the rotor 48, may be varied. The drive from the shaft 24 to the rotor 48 is, of course, through the washers 51 and 53 and the spring 52 compressed therebetween.

The diametrical dimension of the rotor 48 is slightly less than that of the surface 46, so that a narrow, annular space 57 is defined between the guard 44 and the rotor 48; and the line 58, which is stored in a coil within the well 14, extends through that space 57 and can be stripped axially from the drum, through that space. Obviously, the line will "fly" about the axis of the drum as it is so stripped.

At one point in its inner surface adjacent the drum end, the rotor 48 is formed with a radially extending groove 59 in which is reciprocably mounted a catch element 60. A slot 61 opens from said groove through the outer surface of the rotor, and a finger piece 62, located upon said outer surface, is secured to the catch element 60 by means of two screws 63 passing through said slot 61 and engaging the catch element 60. The groove 59 terminates short of the periphery of the rotor, and opens through a slot 64 to permit projection of the nose 65 of the piece 60 beyond the periphery of said rotor to span the space 57. If the guard surface 46 is provided with the groove 47, that groove will be located in the plane of rotation of the element 60, and the nose 65 of the catch element 60 will be designed to enter, and travel in, the groove 47, when the catch element 60 is projected.

The leading edge of the catch element 60 will preferably be notched, as at 66; and, if desired, an agate or similar bearing (not shown) may be suitably mounted at the notched portion of the catch element nose.

At its inner end, the catch element 60 is provided with an upturned portion 67 perforated for the reception of a bearing pin 68 upon which is pivotally mounted a latch lever 69. The lever 69 is formed to provide a latch finger 70 registering with a notch 71 in the catch element 60 and adapted, when the catch element is fully retracted, to register with a socket 72 formed in the rotor 48. A pair of nuts 73 adjustably mounted on one of the screws 63, clamp in suitable position one end of a leaf spring 74 whose opposite end is received in a perforation 75 in the lever 69, the spring being biased to urge the lever 69 to move in a counter-clockwise direction as viewed in Fig. 5. Thus, when the finger 70 attains registry with the socket 72, the spring 74 will cause said finger to enter such socket.

A spring 76 is suitably anchored, as by screws 77, upon the rotor 48, and extends into engagement with one of the nuts 73, said spring 76 constantly resiliently urging the catch element 60 to move radially-outwardly to its position illustrated in Fig. 5. Thus, whenever the latch finger 70 is disengaged from the socket 72, the spring 76 will move the catch element 60 into its projected position in which it spans the space 57.

The lever 69 is provided with a further finger 78 which, when the parts are assembled, projects into proximity with the surface 16 of the base 10. Mounted in said base, with its head projecting forwardly therefrom, is a screw 79, located in the path of rotation of the lever finger 78. Thus, as the rotor 48 turns in a counter-clockwise direction, as viewed in Fig. 2, when the catch element 60 is in its retracted position, the finger 78 will engage the head of the screw 79 to rotate the lever 69 in a clockwise direction, as viewed in Fig. 5, to withdraw the finger 70 from the socket 72, whereby the catch element 60 will be released for projection by the spring 76.

The end 81 of the guard 44 will preferably lie flush with the surface 80 of the base 10; and the surface 38 of the bracket 39 aids in positioning the guard in that relation. The guard may be provided with one or more tapped holes 82 registering with the surface 45 of the base 10, for the reception of set screws, whereby the guard may be more or less fixedly assembled with the base; but I have found that a purely frictional assembly is, in most cases, sufficient; and that such assembly, of course, facilitates disassembly of the reel and desired adjustments thereof.

The finger piece 62 will preferably be provided, at its inner end, with an outturned ear 62' which, it will be seen, is located closely adjacent the knob 56. Such an arrangement facilitates manual retraction of the catch assembly, since the user's fingers are guided to the finger piece 62 by the knob 56 which is coaxial with the reel assembly.

In use, assuming the reel to have been assembled with a rod, and assuming a suitable length of line to have been laid in coils within the well 14, the finger piece 62' is drawn toward the knob 56, whereby the latch finger 70 is moved into registry with the socket 72. The spring 74 immediately acts to move the finger 70 into said notch, whereby the catch assembly is retained in its retracted position. Now, the line 58 can be stripped from the drum through the space 57 without the slightest hindrance.

A suitable length of line having been so stripped from the drum the user will begin to rotate the crank 30. The shaft 24 will be driven through the gears 29 and 26, and the rotation of the shaft will be transmitted to the rotor 48 through the friction drive illustrated in detail in Fig. 3. When the lever finger 78 meets the screw head 79, the lever 69 will be rocked to withdraw the finger 70 from the notch 72, whereupon the catch element 60 will be projected, by the spring 67, to cause its nose 65 to enter the groove 47. Now, when the notched portion 66 of the catch element 60 encounters the line 58 at the point at which the line emerges through the space 57, further travel of the catch element will enforce corresponding travel of the line about the space 57, whereby the line will be laid, in successive turns, within the well 14.

I claim as my invention:

1. In a device of the class described, a stationary drum adapted to retain a coil of line laid on a peripheral surface thereof, a guard element surrounding said drum and spaced radially from the periphery thereof to permit line to be stripped axially from said drum through the space between said drum and said guard element, a disc mounted within the axial extent of said guard element for rotation about the common axis of said drum and said guard element, having a radius somewhat less than that of said guard element, and being positioned beyond that end of said drum from which line may be so stripped, said disc being formed with a radial slot, a catch element, a finger piece, means projecting through said slot, guided therein for radial movement and connecting said catch element and finger piece with said catch element located on that side of said disc adjacent said drum and said finger piece located on that side of said disc remote from said drum, said catch element being shiftable radially into and out of bridging relation to the radial space between said disc and said guard element by radial movement of said finger piece.

2. The device of claim 1 including spring means carried by said disc and operatively engaging said catch element to urge the same into such bridging relation.

3. In a device of the class described, a stationary drum adapted to retain a coil of line laid on a peripheral surface thereof, a guard element surrounding said drum and spaced radially from the periphery thereof to permit line to be stripped axially from said drum through the space between said drum and said guard element, a disc mounted within the axial extent of said guard element for rotation about the common axis of said drum and said guard element, having a radius somewhat less than that of said guard element, and being positioned beyond that end of said drum from which line may be so stripped, said disc being formed with a radial slot, a catch element, a finger piece, means projecting through said slot and connecting said catch element and finger piece with said catch element located on that side of said disc adjacent said drum and said finger piece located on that side of said disc remote from said drum, said catch element being shiftable into and out of bridging relation to the radial space between said disc and said guard element, spring means carried by said disc and operatively engaging said catch element to urge the same into such bridging relation, a lever carried by said catch element for oscillation about an axis substantially radial with respect to said disc and having a first finger, said disc being formed with a notch with which said first finger registers when said catch element is retracted, and further spring means carried by said catch element and bearing on said lever to urge said finger to enter said notch when such registry occurs.

4. The device of claim 3 in which said lever is provided with a second finger, and including means fixed with respect to said drum and positioned in the rotary path of said second finger, said last-named means being operative, upon rotation of said disc, to engage said second finger to tilt said lever about its axis against the tendency of said further spring means to withdraw said first finger from said notch.

5. Line-winding mechanism comprising a base, a storage drum upon which line may be laid, said drum being fixed with respect to said base, a rotor supported from said base for rotation about the axis of said drum, a guard element substantially concentric with said drum, supported from said base, spaced radially slightly beyond the peripheral surface of said drum, and spanning said surface, a line-engaging element carried by said rotor adjacent that end surface of said drum remote from said base, said guard element projecting into the plane of rotation of said line-engaging element, said line-engaging element being shiftable between a position in which it spans the radial space between said guard element and the peripheral surface of said drum and a position in which it is located wholly within a diameter of said drum, spring means resiliently urging said line-engaging element toward its first-mentioned position, manually-actuable means for retracting said line-engaging element to its second-mentioned position, means for rotating said rotor, latch means moving with said rotor and engageable with said line-engaging element to retain the latter in retracted position, and means supported from said base in the rotary path of said latch means and cooperable with said latch means, upon rotation of said rotor, to actuate said latch means to release said line-engaging element.

6. In a device of the class described, a stationary drum adapted to retain a coil of line laid on a peripheral surface thereof, a guard element surrounding said drum and spaced radially from the periphery thereof to permit line to be stripped axially from said drum through the space between said drum and said guard element, a rotor mounted within the axial extent of said guard element for rotation about the common axis of said drum and said guard element, said rotor having a radial extent somewhat less than that of said guard element and being positioned beyond that end of said drum from which line may be so stripped, said rotor having a discoid surface facing said drum end and provided with a substantially radial channel opening through said surface and through the periphery of said rotor, a catch element guided for reciprocation in said channel, spring means moving with said rotor and urging said catch element radially outwardly to a position bridging the radial space between the periphery of said rotor and said guard element, manually-actuable means projecting from said rotor away from said drum end and operatively connected to said catch element to retract said catch element against the tendency of said spring means, and latch means moving with said rotor and cooperable with said catch element to retain the same in retracted position, and means fixed with respect to said drum and positioned in the rotary path of said latch means, said last-named means being engaged by said latch means, upon rotation of said rotor, to shift said latch means to release said catch element.

CLYDE D. SHELBURNE.

References Cited in the file of this patent

UNITED STATES PATENTS

| Number | Name | Date |
|---|---|---|
| 2,314,616 | Gaire | Mar. 23, 1943 |
| 2,428,324 | Worden | Sept. 30, 1947 |
| 2,492,587 | Ledingham | Dec. 27, 1949 |
| 2,498,987 | Duncan | Feb. 28, 1950 |
| 2,507,457 | Rix | May 9, 1950 |

FOREIGN PATENTS

| Number | Country | Date |
|---|---|---|
| 22,597 | Great Britain | of 1907 |
| 487,818 | Great Britain | June 27, 1938 |
| 492,879 | Great Britain | Sept. 28, 1938 |
| 828,000 | France | Feb. 2, 1938 |